United States Patent
Komiya

(10) Patent No.: US 8,893,465 B2
(45) Date of Patent: Nov. 25, 2014

(54) CABLE PROTECTION AND GUIDE DEVICE

(71) Applicant: Tsubakimoto Chain Co., Osaka (JP)

(72) Inventor: Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 14/085,814

(22) Filed: Nov. 21, 2013

(65) Prior Publication Data

US 2014/0182262 A1 Jul. 3, 2014

(30) Foreign Application Priority Data

Dec. 28, 2012 (JP) ................... 2012-288139

(51) Int. Cl.
*F16G 13/16* (2006.01)
*H02G 11/00* (2006.01)
*H02G 3/04* (2006.01)

(52) U.S. Cl.
CPC .............. *F16G 13/16* (2013.01); *H02G 3/0475* (2013.01)
USPC .................................. 59/78.1; 248/49; 248/51

(58) Field of Classification Search
CPC ........................................................ F16G 13/16
USPC ........................................ 59/78.1; 248/49, 51
See application file for complete search history.

(56) References Cited

U.S. PATENT DOCUMENTS 3,716,986 A * 2/1973 Cork et al. ............... 59/78.1
6,510,682 B2 * 1/2003 Komiya et al. ........... 59/78.1

FOREIGN PATENT DOCUMENTS

JP H05-038034 2/1993
JP 4658221 3/2011

* cited by examiner

*Primary Examiner* — David B Jones
(74) *Attorney, Agent, or Firm* — Jianq Chyun IP Office

(57) ABSTRACT

A cable protection and guide device is provided, which prevents abrasion of the cable skin of a cable or the like and holds the position of a multi-joint link with high precision. The cable protection and guide device is characterized in that the multi-joint link includes a link member and a pair of holding members attached to the link member for holding the cable. A flexional inner side holding member has an inner side base part and an inner side holding part that are integrally formed. A flexional outer side holding member has an outer side base part and an outer side holding part that are integrally formed, and the outer side holding part cooperates with the inner side holding part to hold the cable.

5 Claims, 5 Drawing Sheets

CABLE PROTECTION AND GUIDE DEVICE

CROSS-REFERENCE TO RELATED APPLICATIONS

This application claims the priority benefit of Japan application serial no. 2012-288139, filed on Dec. 28, 2012. The entirety of the above-mentioned patent application is hereby incorporated by reference herein and made a part of this specification.

BACKGROUND OF THE INVENTION

1. Field of the Invention

The present invention relates to a cable protection and guide device that securely protects and guides a flexible cable, such as an electric cable for transmitting electric signals or supplying electricity or a hose for supplying oil or air pressure, which connects a movable portion and a fixed portion of an industrial machine or a vehicle, etc.

2. Description of Related Art

According to the prior art, a known cable protection and guide device is provided with a multi-joint link that is formed by connecting a plurality of link members in a cable longitudinal direction, and the cable protection and guide device guides a cable from a cable fixed end to a cable movable end and is capable of taking a linear position to be in contact with a support surface of a support body and a flexional position to be separated from the support surface (Patent Literatures 1 and 2, for example).

The conventional cable protection and guide device accommodates and guides the cable in the interior with flexibility.

PRIOR ART LITERATURE

Patent Literature

[Patent Literature 1] Japanese Patent Publication No. 5-38034
[Patent Literature 2] Japanese Patent No. 4658221

SUMMARY OF THE INVENTION

However, due to the structure that accommodates the cable in the interior with flexibility, the aforementioned conventional cable protection and guide device faces the problems that the cable skin of the cable may be worn to generate frictional powder when the cable movable end is moved and causes the cable and the cable protection and guide device to slide relatively, and that the cable protection and guide device may have increased size and relatively larger mass in order to accommodate the cable therein, which results in a greater inertial force when the cable movable end is moved and makes it difficult to hold the position with high precision.

Considering the aforementioned issues, the present invention provides a cable protection and guide device that prevents abrasion of the cable skin of the cable and holds the position of the multi-joint link with high precision.

In view of the above, a cable protection and guide device according to a first aspect of the present invention includes a multi-joint link that is formed by connecting a plurality of link members in a cable longitudinal direction. The cable protection and guide device guides a cable from a cable fixed end to a cable movable end, and is capable of providing a linear position to be in contact with a support surface of a support body and a flexional position to be separated from the support surface. The multi-joint link includes the plurality of link members and a pair of holding members, in which the pair of holding members is attached to at least one part of the plurality of link members and includes a multi-joint link flexional inner side holding member and a flexional outer side holding member for holding the cable at a flexional inner side and a flexional outer side. The at least one part of the plurality of link members includes a connection pin formed at one end side thereof in the cable longitudinal direction, a pin hole formed at the other end side thereof in the cable longitudinal direction to be rotatably engaged with the connection pin, and a flexional inner side engaging part and a flexional outer side engaging part disposed between the connection pin and the pin hole in the cable longitudinal direction. The flexional inner side holding member includes an inner side base part to be engaged with the flexional inner side engaging part and an inner side holding part that extends from the inner side base part toward two outer sides of a multi-joint link width direction to be in contact with the cable at the flexional inner side, and the inner side base part and the inner side holding part are formed integrally with each other. The flexional outer side holding member includes an outer side base part to be engaged with the flexional outer side engaging part and an outer side holding part that extends from the outer side base part toward two outer sides of the multi-joint link width direction to be in contact with the cable at the flexional outer side and coordinates with the inner side holding part of the flexional inner side holding member to hold the cable, and the outer side base part and the outer side holding part are formed integrally with each other.

According to a second aspect of the present invention, in addition to the aforementioned structure of the cable protection and guide device of the first aspect, one of the flexional inner side engaging part and the inner side base part includes an inner side engaging pin while the other one of the flexional inner side engaging part and the inner side base part includes an inner side engaging hole to be engaged with the inner side engaging pin; and one of the flexional outer side engaging part and the outer side base part includes an outer side engaging pin while the other one of the flexional outer side engaging part and the outer side base part includes an outer side engaging hole to be engaged with the outer side engaging pin.

According to a third aspect of the present invention, in addition to the aforementioned structure of the cable protection and guide device of the first or second aspect, the inner side holding part and the outer side holding part respectively include a plurality of locking holes that are arranged at a predetermined interval along the multijoint link width direction and penetrate in a multi-joint link flexional inner-outer direction, and the locking holes are formed to be freely engaged with a pin, which is a member other than the flexional inner side holding member and the flexional outer side holding member.

According to a fourth aspect of the present invention, in addition to the aforementioned structure of the cable protection and guide device of the first or second aspect, one of the inner side holding part and the outer side holding part includes a plurality of locking holes that are arranged at a predetermined interval along the multi-joint link width direction and penetrate in the multi joint link flexional inner-outer direction, while the other one of the inner side holding part and the outer side holding part includes a plurality of protrusions that are arranged at a predetermined interval along the multi-joint link width direction to be engaged freely with the locking holes respectively.

According to a fifth aspect of the present invention, in addition to the aforementioned structure of the cable protection and guide device of any one of the first to the fourth aspects, a hardness of the flexional outer side holding member is set to be lower than a hardness of the flexional inner side holding member.

The cable protection and guide device of the present invention, which has the multi-joint link formed by connecting multiple link members in the cable longitudinal direction and guides the cable from the cable fixed end to the cable movable end and is capable of taking the linear position to be in contact with the support surface of the support body and taking the flexional position to be separated from the support surface, can not only protect and guide the cable but also have the following particular effects.

In the cable protection and guide device of the first aspect of the present invention, the multi-joint link includes the plurality of link members and the pair of holding members, in which the pair of holding members is attached to the at least one part of the plurality of link members and includes the flexional inner side holding member and the flexional outer side holding member for holding the cable between the flexional inner side and the flexional outer side. The at least one part of the plurality of link members includes the connection pin formed at one end side thereof in the cable longitudinal direction, the pin hole formed at the other end side thereof in the cable longitudinal direction to be rotatably engaged with the connection pin, and the flexional inner side engaging part and the flexional outer side engaging part disposed between the connection pin and the pin hole in the cable longitudinal direction. The flexional inner side holding member includes the inner side base part to be engaged with the flexional inner side engaging part and the inner side holding part that extends from the inner side base part toward two outer sides of the multi-joint link width direction to be in contact with the cable at the flexional inner side, and the inner side base part and the inner side holding part are formed integrally with each other. The flexional outer side holding member includes the outer side base part to be engaged with the flexional outer side engaging part and the outer side holding part that extends from the outer side base part toward two outer sides of the multi-joint link width direction to be in contact with the cable at the flexional outer side and cooperates with the inner side holding part of the flexional inner side holding member to hold the cable, and the outer side base part and the outer side holding part are formed integrally with each other. Since the pair of holding members, including the flexional inner side holding member and the flexional outer side holding member, holds the cable and the cable does not slide on the pair of holding members, abrasion of the cable skin of the cable can be prevented.

Further, in comparison with the conventional structure that the interior of the link member is made hollow where the cable is inserted therethrough, the link member of the present invention is compact and has less mass, which results in a smaller inertial force when it stops. Therefore, the position of the link member of the present invention can be held with high precision.

Similarly, since the link member of the present invention is compact and has less mass, which results in a smaller inertial force when it is moved, the output of a power source of the device can be reduced.

In other words, a motor, etc., that serves as the power source can be miniaturized.

Additionally, the parts can be smaller and the number of the parts can be reduced to significantly decrease the production costs.

Moreover, in comparison with the conventional structure that the interior of the link member is made hollow where the cable is inserted therethrough, the link member of the present invention is formed compact to avoid collision between link members during movement. Therefore, the impact sound can be reduced.

In the situation of disposing multiple cables, the cables are arranged in parallel to each other along the multi-joint link width direction and have approximately the same curvature radius when the cables are bent. Thus, problems such as breaking of the cables resulting from an excessive force on the cables caused by different curvature radii can be avoided.

Additionally, in the situation that multiple cables are disposed and held respectively at two sides of the multi-joint link width direction, a repulsive force due to a bending resistance of the cables held at one side is reduced or compensated by a repulsive force generated in the same way at the other side. Therefore, the forces that twist the multi-joint link in certain directions can be mostly nullified.

In other words, the forces at two sides of the multi-joint link width direction are well balanced, so as to prevent twisting the multi-joint link and smoothen the bending of the multi-joint link.

According to the cable protection and guide device of the second aspect of the present invention, in addition to the effects of the first aspect, one of the flexional inner side engaging part and the inner side base part includes the inner side engaging pin while the other one of the flexional inner side engaging part and the inner side base part includes the inner side engaging hole to be engaged with the inner side engaging pin; and one of the flexional outer side engaging part and the outer side base part includes the outer side engaging pin while the other one of the flexional outer side engaging part and the outer side base part includes the outer side engaging hole to be engaged with the outer side engaging pin. Because the engagement of the flexional inner side engaging part and the inner side base part and the engagement of the flexional outer side engaging part and the outer side base part become easy, the flexional inner side holding member and the flexional outer side holding member can be attached to at least one part of the plurality of link members easily.

According to the cable protection and guide device of the third aspect of the present invention, in addition to the effects of the first or second aspect, the inner side holding part and the outer side holding part respectively include the plurality of locking holes that are arranged at the predetermined interval along the multi-joint link width direction and penetrate in the multi-joint link flexional inner-outer direction, and the locking holes are formed to be freely engaged with the pin, which is a member other than the flexional inner side holding member and the flexional outer side holding member. By selecting the locking holes in correspondence to the diameter of the cable, an unnecessary gap between the cable and the inner side holding part and the outer side holding part of the pair of holding members is reduced and the holding force for holding the cable is increased. Thus, abrasion of the cable skin of the cable can be prevented with certainty.

In addition, with the pin disposed between multiple cables along the multi joint link width direction, the cables are arranged along the multi-joint link width direction without contacting each other. Accordingly, abrasion of the cable skin that results from contact between the cables can be prevented.

According to the cable protection and guide device of the fourth aspect of the present invention, in addition to the effects of the first or second aspect, one of the inner side holding part and the outer side holding part includes the plurality of locking holes that are arranged at the predetermined interval along the multi-joint link width direction and penetrate in the multi-joint link flexional inner-outer direction, while the other one of the inner side holding part and the outer side holding part includes the plurality of protrusions that are arranged at the predetermined interval along the multi joint link width direction to be engaged freely with the locking holes respectively. By selecting the locking holes in correspondence to the diameter of the cable, the unnecessary gap between the cable and the inner side holding part and the outer side holding part of the pair of holding members is reduced and the holding force for holding the cable is increased. Therefore, effects of the third aspect of the present invention can also be achieved.

Because the locking holes of one of the inner side holding part and the outer side holding part are engaged with the protrusions of the other one, it is not required to dispose the additional pin, and the number of the parts can be reduced when compared with the structure of the third aspect.

According to the cable protection and guide device of the fifth aspect of the present invention, in addition to the effects of any one of the first to the fourth aspects, the hardness of the flexional outer side holding member is set to be lower than the hardness of the flexional inner side holding member. Therefore, compared to an flexional outer side holding member that has higher hardness, the flexional outer side holding member that has lower hardness causes a smaller impact sound when contacting the support surface, and as a result, the noise generated during movement of the cable can be reduced significantly.

Moreover, because one of the parts has lower hardness, it can be easily deformed when assembled to facilitate the assembly process.

DESCRIPTION OF THE EMBODIMENTS

Figure 1:
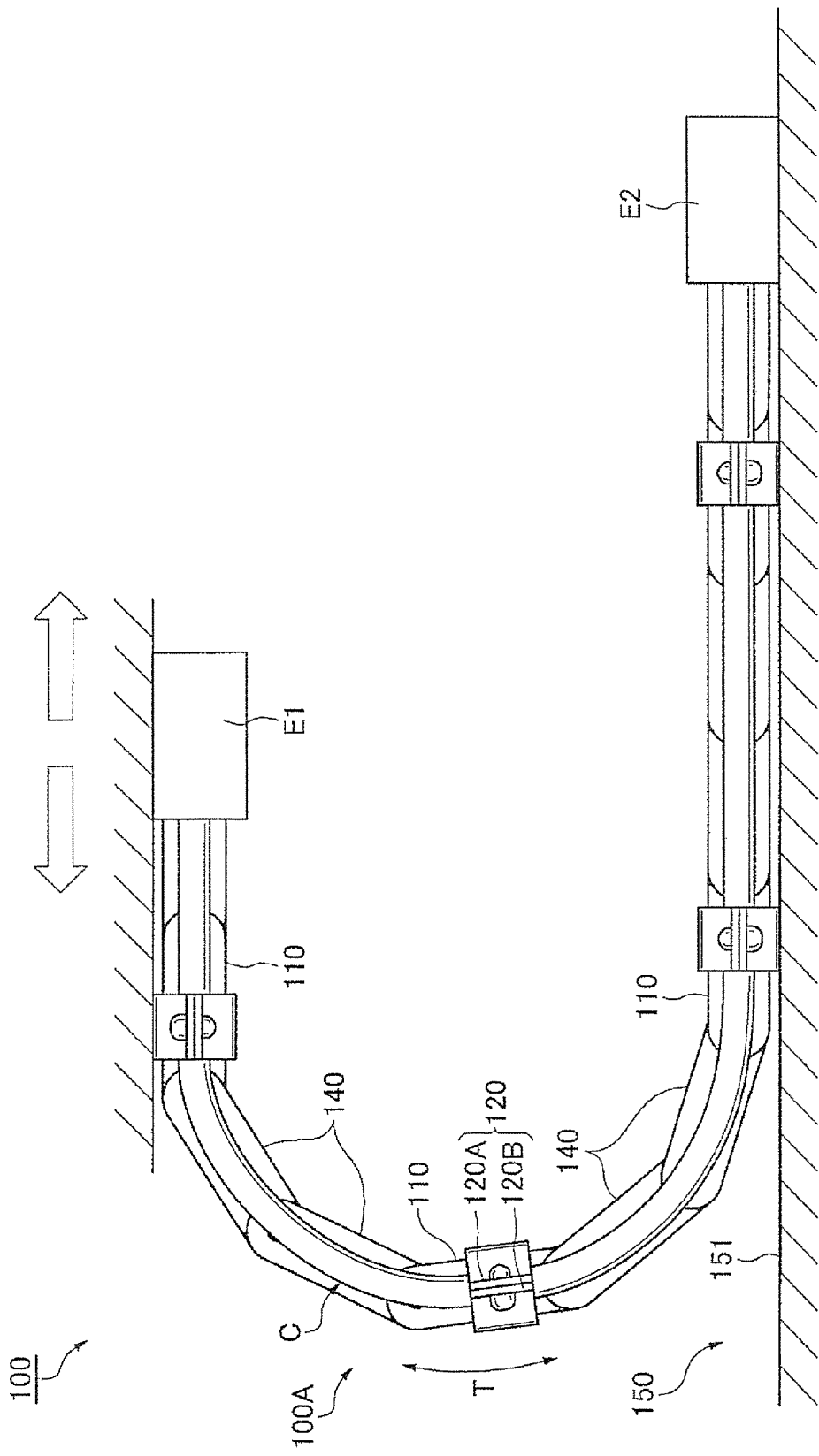
FIG. 1 is a schematic view illustrating a cable protection and guide device of an exemplary embodiment of the present invention.

A cable protection and guide device of the present invention is not particularly limited as long as the cable protection and guide device includes a multi-joint link formed by connecting a plurality of link members in a cable longitudinal direction and is capable of taking a linear position to be in contact with a support surface of a support body and a flexional position to be separated from the support surface, to guide a cable from a cable fixed end to a cable movable end. The multi-joint link includes a first link member and a second link member serving as the plurality of link members, and a pair of holding members, which includes a flexional inner side holding member and a flexional outer side holding member and is attached to the first link member, serving as at least one part of the plurality of link members, for holding the cable between a flexional inner side and a flexional outer side. The at least one part of the plurality of link members includes a connection pin formed at one end side thereof in the cable longitudinal direction, a pin hole formed at the other end side thereof in the cable longitudinal direction to be rotatably engaged with the connection pin, and a flexional inner side engaging part and a flexional outer side engaging part disposed between the connection pin and the pin hole in the cable longitudinal direction. The flexional inner side holding member includes an inner side base part to be engaged with the flexional inner side engaging part and an inner side holding part that extends from the inner side base part toward two outer sides of the multi-joint link width direction to be in contact with the cable at the flexional inner side, and the inner side base part and the inner side holding part are formed integrally with each other. The flexional outer side holding member includes an outer side base part to be engaged with the flexional outer side engaging part and an outer side holding part that extends from the outer side base part toward two outer sides of the multi-joint link width direction to be in contact with the cable at the flexional outer side and cooperates with the inner side holding part of the flexional inner side holding member to hold the cable, and the outer side base part and the outer side holding part are formed integrally with each other, thereby preventing abrasion of the cable skin of the cable and holding the position of the multi joint link with high precision.

For example, a material of the link member used in the cable protection and guide device of the present invention may be a synthetic resin, such as engineering resin, etc., or a metal, such as aluminum, etc.

In addition, a shape of the link member is not particularly limited as long as the link members can be respectively connected with one another in the cable longitudinal direction, and be moved relatively by bending back the cable between the cable fixed end and the cable movable end in the cable longitudinal direction.

Also, the cable is not particularly limited and may be a flexible linear object, such as an electric cable that is used for supplying electric power or transmitting signals, or a hose for conducting material containing fluid in machines.

Moreover, the engagement between the flexional inner side engaging part and the inner side base part, and the engagement between the flexional outer side engaging part and the outer side base part, may be any structure as long as one can be pressed into the other, or one's claw can be hooked onto a concave of the other.

[Embodiments]

Below a cable protection and guide device 100 of an exemplary embodiment of the present invention is described on the basis of FIGS. 1 to 5C.

Figure 2:
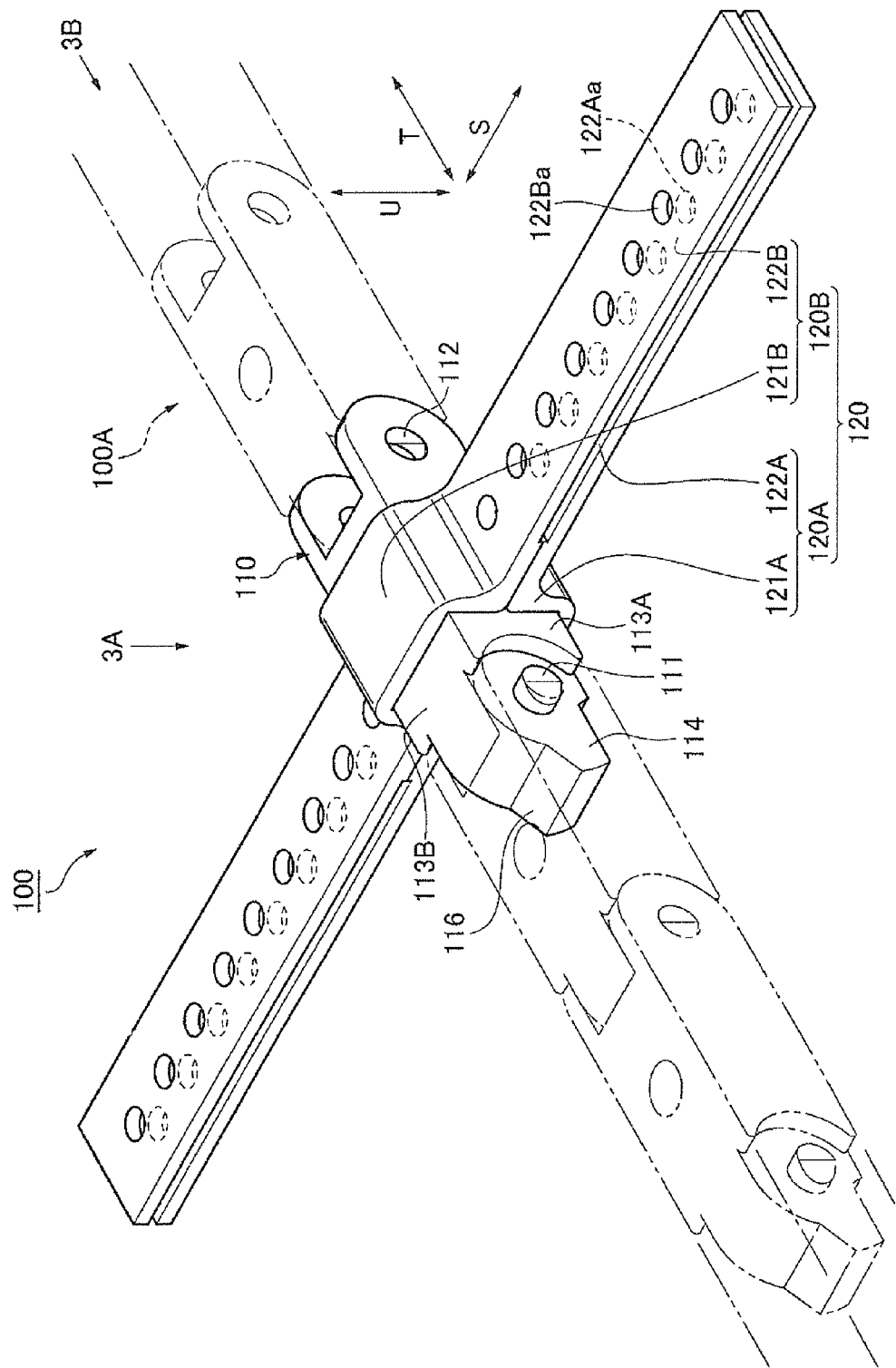
FIG. 2 is a perspective view illustrating a first link member and a pair of holding members of an exemplary embodiment of the present invention.
Figure 3A:
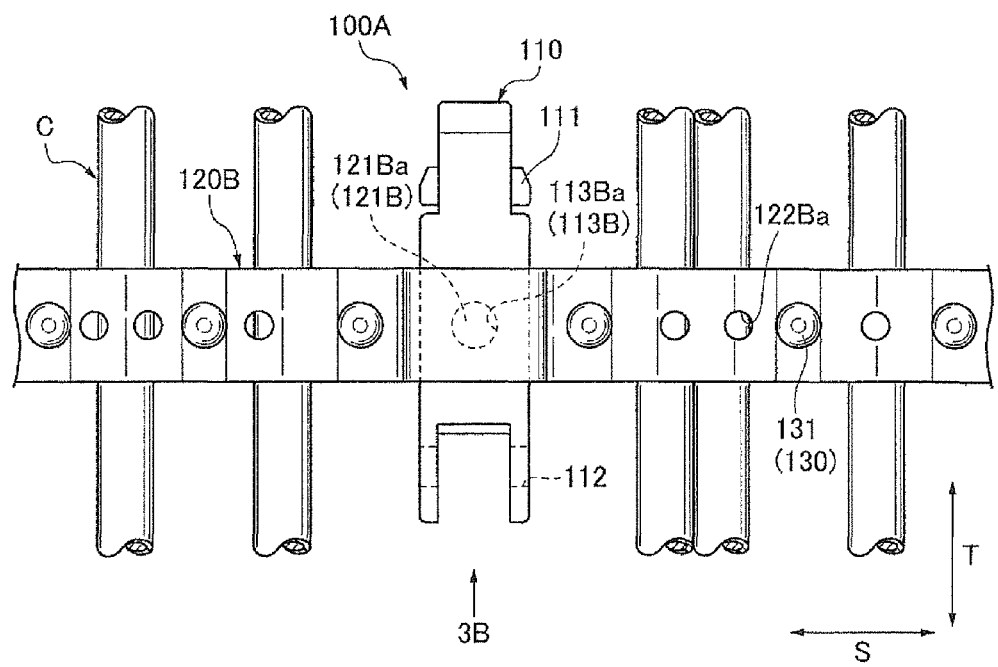
FIGS. 3A to 3B are schematic views illustrating a multi-joint link and a cable and the like of an exemplary embodiment of the present invention.
Figure 3B:
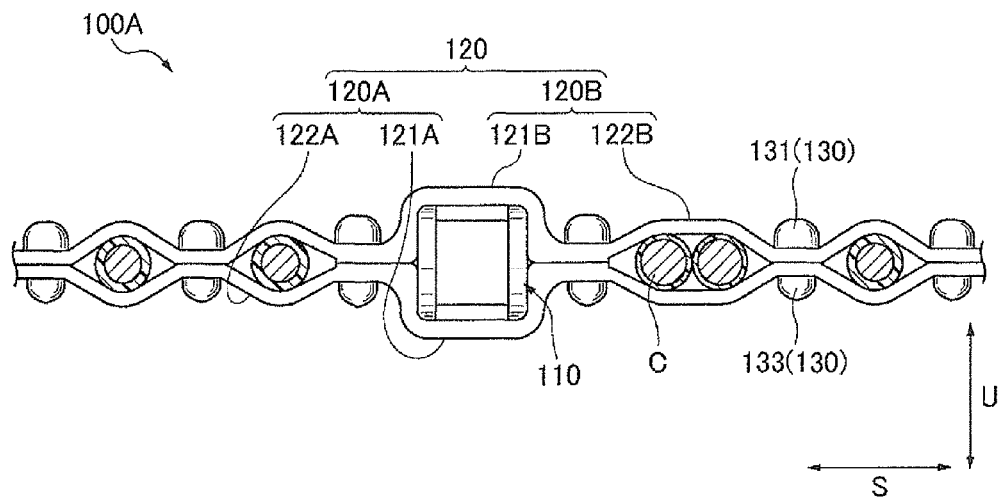
Figure 4A:
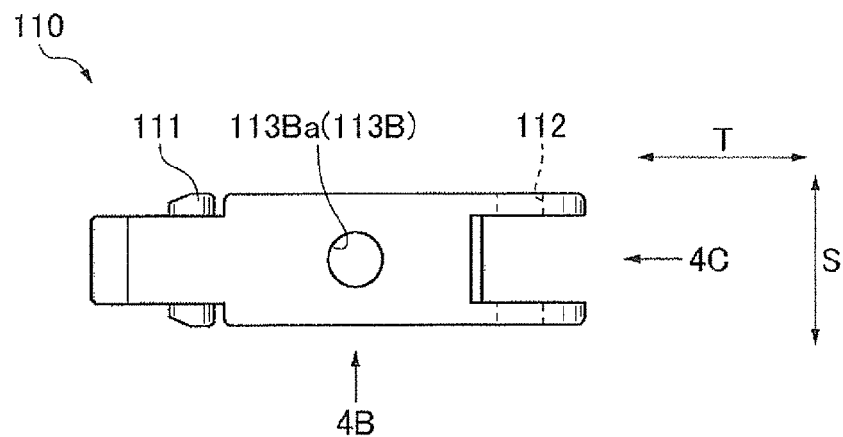
FIGS. 4A to 4C are schematic views illustrating a first link member of an exemplary embodiment of the present invention.
Figure 4B:
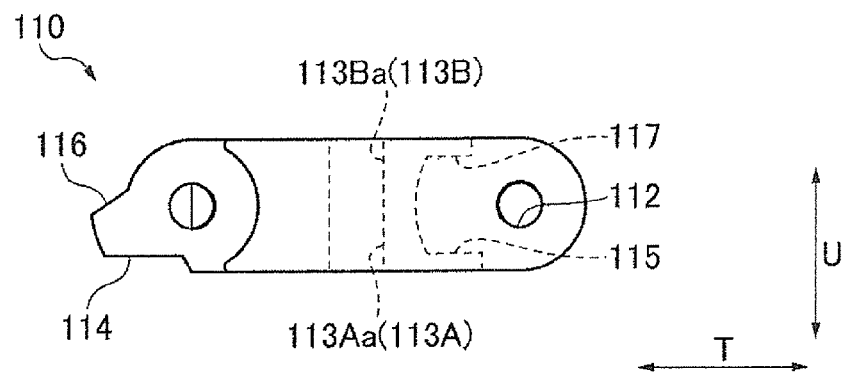
Figure 4C:
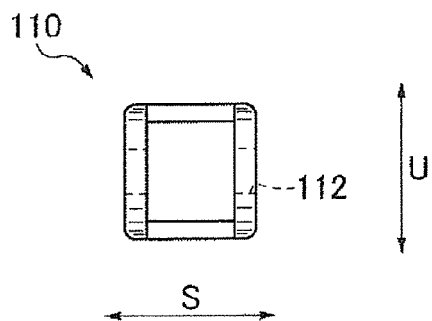
Figure 5A:
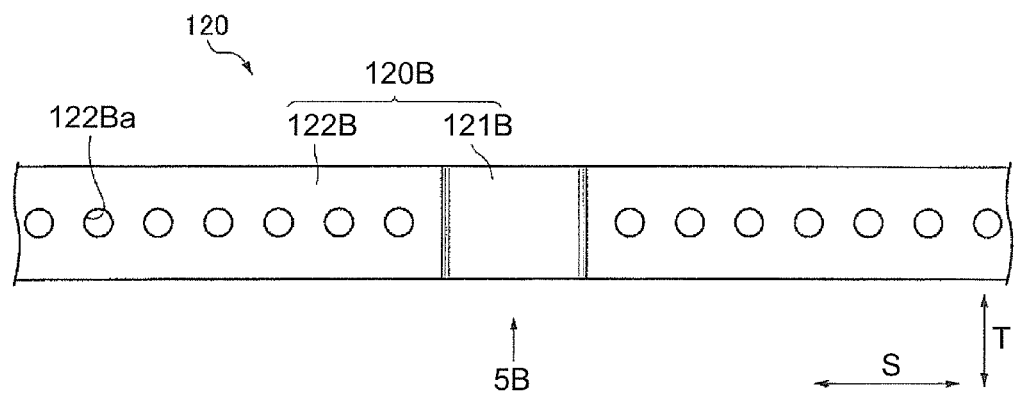
FIGS. 5A to 5C are schematic views illustrating a pair of holding members and a pin of an exemplary embodiment of the present invention.
Figure 5B:
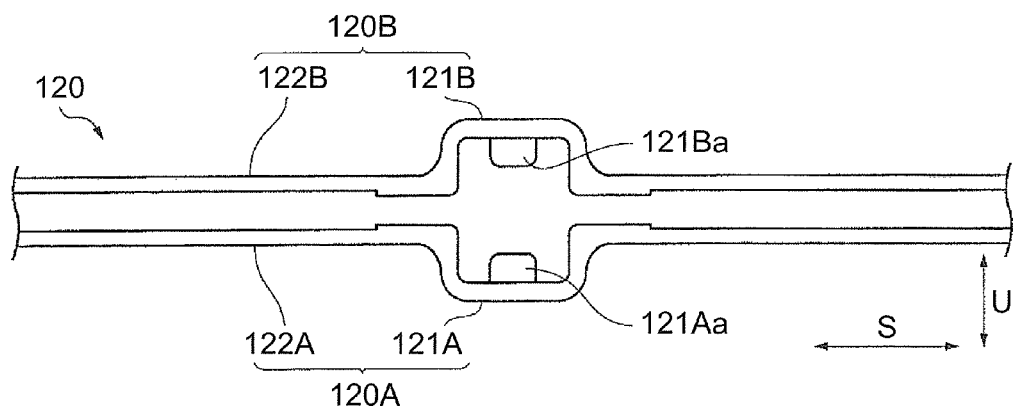
Figure 5C:
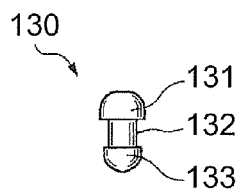

FIG. 1 is a schematic view of the cable protection and guide device 100 of an exemplary embodiment of the present invention when viewed from a multi-joint link width direction S. FIG. 2 is a perspective view illustrating a first link member 110 and a pair of holding members 120 of an exemplary embodiment of the present invention. FIG. 3A is a schematic view illustrating a multi joint link 100A and a cable C and the like of an exemplary embodiment of the present invention when viewed from a flexional outer side of the multi-joint link 100A. FIG. 3B is a schematic view observed from the arrow 3B shown in FIG. 3A. FIG. 4A is a schematic view of the first link member 110 of an exemplary embodiment of the present invention when viewed from the flexional outer side of the multi-joint link 100A. FIG. 4B is a schematic view observed from the arrow 4B shown in FIG. 4A. FIG. 4C is a schematic view observed from the arrow 4C shown in FIG. 4A. FIG. 5A is a schematic view illustrating the pair of holding members 120 of an exemplary embodiment of the present invention when viewed from the flexional outer side of the multi-joint link 100A. FIG. 5B is a schematic view observed from the arrow 5B shown in FIG. 5A. FIG. 5C is a schematic view of a pin 130.

The cable C and the like are depicted in FIG. 3A and FIG. 3B. It should be noted that the cable C and the like are omitted from FIG. 2 in order to facilitate the illustration of the shape of the pair of holding members 120.

As shown in FIGS. 1 to 5C, the cable protection and guide device 100 of an exemplary embodiment of the present invention is provided in a machine (not shown), which includes the cable C, and used for protecting and guiding the cable C.

The aforementioned machine is a semiconductor fabrication apparatus, a pharmaceutical development and test apparatus, a vehicle door opening and closing device, or a machine tool, for example.

The cable protection and guide device 100 includes the multi-joint link 100A that is formed by connecting a plurality of link members (110, 140) in a cable longitudinal direction T. The cable protection and guide device 100 is disposed to guide the cable C from a cable fixed end E2 to a cable movable end E1, and take a linear position to be in contact with a support surface 151 of a support body 150 and take a flexional position to be separated from the support surface 151.

Furthermore, the multi-joint link 100A includes the first link member 110 and a second link member 140 serving as the plurality of link members, and the pair of holding members 120. The pair of holding members 120 is attached to the first link member 110, which serves as at least one part of the plurality of link members, to hold the cable C between a flexional inner side and the flexional outer side of the multi-joint link 100A.

Here, the first link member 110 is the part that the pair of holding members 120 is attached to.

The second link member 140 is the part that the pair of holding members 120 is not attached to.

In addition, the pair of holding members 120 includes a flexional inner side holding member 120A and a flexional outer side holding member 120B.

The structure of the second link member 140 is substantially the same as the structure of the first link member 110. The only difference is that the second link member 140 does not have the below-described flexional inner side engaging part 113A and flexional outer side engaging part 113B, or alternatively even though the second link member 140 has the flexional inner side engaging part 113A and the flexional outer side engaging part 113B, the pair of holding members 120 is not attached thereto. Therefore, details of the structure of the second link member 140 will be omitted.

According to the present invention, at least a portion of the first link members 110 may be connected in plural in the cable longitudinal direction T to form the multi-joint link 100A.

In other words, the second link member 140 may be disposed and connected between one first link member 110 and another first link member 110, or a plurality of the first link members 110 may be connected without inserting the second link member 140 therebetween.

The first link member 110 includes a connection pin 111, a pin hole 112, and the flexional inner side engaging part 113A and the flexional outer side engaging part 113B. The connection pin 111 is formed at one end side of the first link member 110 in the cable longitudinal direction T. The pin hole 112 is formed at the other end side in the cable longitudinal direction T to be rotatably engaged with another connection pin 111. The flexional inner side engaging part 113A and the flexional outer side engaging part 113B are disposed between the connection pin 111 and the pin hole 112 in the cable longitudinal direction T.

The flexional inner side holding member 120A includes an inner side base part 121A and an inner side holding part 122A that are formed integrally with each other. The inner side base part 121A is to be engaged with the flexional inner side engaging part 113A. The inner side holding part 122A extends from the inner side base part 121A toward two outer sides of the multi-joint link width direction S and is in contact with the cable C at the flexional inner side.

Likewise, the flexional outer side holding member 120B includes an outer side base part 121B and an outer side holding part 122B that are formed integrally with each other. The outer side base part 121B is to be engaged with the flexional outer side engaging part 113B. The outer side holding part 122B extends from the outer side base part 121B toward two outer sides of the multi joint link width direction S and is in contact with the cable C at the flexional outer side. The outer side holding part 122B cooperates with the inner side holding part 122A of the flexional inner side holding member 120A to hold the cable C.

In this way, the cable C is held by the pair of holding members 120 including the flexional inner side holding member 120A and the flexional outer side holding member 120B, and does not slide relative to the pair of holding members 120.

In comparison with the conventional structure that the interior of the link member is made hollow where the cable C is inserted therethrough, the link members (110, 140) of the present invention are formed compact with less mass to reduce an inertial force when the link members stop.

Similarly, the link members (110, 140) are formed compact with less mass to reduce the inertial force during movement.

In other words, a motor, etc., that serves as a power source can be miniaturized.

Since the parts are reduced in size and the number of the parts is also reduced, the fabrication costs can be lowered significantly.

Moreover, in comparison with the conventional structure that the interior of the link member is made hollow where the cable C is inserted therethrough, the link members (110, 140) of the present invention are formed compact to reduce collision places between the link members (110, 140) during movement.

Even though there are a plurality of cables C, the cables C are arranged in parallel to each other along the multi-joint link width direction S and have approximately the same curvature radius when the cables C are bent.

Additionally, in the situation that multiple cables C are disposed and held at two sides along the multi-joint link width direction, a repulsion force due to a bending resistance of the cables C, which is generated by holding the cables C at one side, is compensated or reduced by a repulsion force generated in the same way at the other side of the width direction.

In other words, the forces at two sides of the multi-joint link width direction are well balanced to prevent twisting the multi-joint link 100A and to smoothen the bending of the multi-joint link 100A.

To be more specific, as shown in FIGS. 4A to 4C, the first link member 110 includes the connection pin 111, the pin hole 112, the flexional inner side engaging part 113A, the flexional outer side engaging part 113B, a one end side linear position holding surface 114, an other end side linear position holding surface 115, a one end side flexional position restricting surface 116, and an other end side flexional position restricting surface 117.

Among the above, the connection pin 111 is disposed at one end-side of the first link member 110 in the cable longitudinal direction T and protrudes toward two sides of the multi-joint link width direction S.

The pin hole 112 is formed at the other end side of the first link member 110 in the cable longitudinal direction T to be rotatably engaged with the connection pin 111 of the adjacent first link member 110 in the cable longitudinal direction T.

The flexional inner side engaging part 113A and the flexional outer side engaging part 113B are disposed between the connection pin 111 and the pin hole 112 of the first link member 110 in the cable longitudinal direction T.

In this exemplary embodiment, the flexional inner side engaging part 113A, which is one of the flexional inner side engaging part 113A and the inner side base part 121A, includes an inner side engaging pin 121Aa.

The inner side base part 121A, which is the other one of the flexional inner side engaging part 113A and the inner side base part 121A, includes an inner side engaging hole 113Aa to be engaged with the inner side engaging pin 121Aa.

Likewise, the flexional outer side engaging part 113B, which is one of the flexional outer side engaging part 113B and the outer side base part 121B, includes an outer side engaging pin 121Ba.

The outer side base part 121B, which is the other one of the flexional outer side engaging part 113B and the outer side base part 121B, includes an outer side engaging hole 113Ba to be engaged with the outer side engaging pin 121Ba.

Accordingly, the engagement of the flexional inner side engaging part 113A and the inner side base part 121A and the engagement of the flexional outer side engaging part 113B and the outer side base part 121B become easy.

In this exemplary embodiment, the inner side engaging pin 121Aa is pressed into the inner side engaging hole 113Aa, and the outer side engaging pin 121Ba is pressed into the outer side engaging hole 113Ba.

Moreover, the one end side linear position holding surface 114 is arranged at one end side of the first link member 110 in the cable longitudinal direction T while the other end side linear position holding surface 115 is arranged at the other end side of the first link member 110 in the cable longitudinal direction T.

When the multi joint link 100A is in the linear position, the one end side linear position holding surface 114 of one first link member 110 is in surface contact with the other end side linear position holding surface 115 of the adjacent second link member 140 (or the adjacent first link member 110) in the cable longitudinal direction T.

Similarly, the one end side flexional position restricting surface 116 is arranged at one end side of the first link member 110 in the cable longitudinal direction T while the other end side flexional position restricting surface 117 is arranged at the other end side of the first link member 110 in the cable longitudinal direction T.

When the multi-joint link 100A is in the flexional position, the one end side flexional position restricting surface 116 of one first link member 110 is in surface contact with the other end side flexional position restricting surface 117 of the adjacent second link member 140 (or the adjacent first link member 110) in the cable longitudinal direction T.

That is, one first link member 110 and the adjacent second link member 140 (or the adjacent first link member 110) are slightly bent at an obtuse angle, and a part of the multi-joint link 100A becomes the flexional position and is arc-shaped.

As a result, the cable C is bent like an arc without being folded.

Further, with reference to FIGS. 5A to 5B, the flexional inner side holding member 120A has the inner side base part 121A and the inner side holding part 122A that are integrally formed.

Likewise, the flexional outer side holding member 120B has the outer side base part 121B and the outer side holding part 122B that are integrally formed.

Here, the flexional inner side holding member 120A and the flexional outer side holding member 120B are formed of a flexible material.

Therefore, the flexional inner side holding member 120A and the flexional outer side holding member 120B can be easily deformed when assembled.

Furthermore, a hardness of the flexional outer side holding member 120B is set to be lower than a hardness of the flexional inner side holding member 120A.

Accordingly, even though the flexional outer side holding member 120B comes in contact with the support surface 151 of the support body 150 which serves as a reference surface during movement, the flexional outer side holding member 120B having lower hardness can be flexed to absorb the impact and reduce the impact sound easily, compared with an flexional outer side holding member 120B having higher hardness.

In other words, noise can be reduced.

In this exemplary embodiment, the inner side holding part 122A has a plurality of locking holes 122Aa that are arranged at a predetermined interval along the multi-joint link width direction S and penetrate the inner side holding part 122A in a multi-joint link flexional inner-outer direction U.

Likewise, the outer side holding part 122B has a plurality of locking holes 122Ba that are arranged at a predetermined interval along the multi-joint link width direction S and penetrate the outer side holding part 122B in the multi-joint link flexional inner-outer direction U.

The locking holes 122Aa and 122Ba are formed to be engaged freely with another member, i.e. the pin 130.

Thus, by selecting locking holes 122Aa and 122Ba in correspondence to the diameters of the cables C, an unnecessary gap between the cables C and the inner side holding part 122A and the outer side holding part 122B of the pair of holding members 120 is reduced and the holding force for holding the cables C is increased.

In addition, with the pins 130 disposed between the cables C along the multi-joint link width direction S, the cables C are arranged along the multi-joint link width direction S without contacting each other.

In other words, abrasion of skin that results from contact between the cables C is prevented.

More specifically, the pin 130 has a large-diameter part 131, a small-diameter part 132, and a middle-diameter part 133.

A diameter of the large-diameter part 131 and a diameter of the middle-diameter part 133 are set to be larger than the diameters of the locking holes 122Aa and 122Ba. A diameter of the small-diameter part 132 is set to be smaller than the diameters of the locking holes 122Aa and 122Ba.

When the middle-diameter part 133 is pushed into the locking hole 122Aa and 122Ba, the locking hole 122Aa and 122Ba is pushed wider to allow the middle-diameter part 133 to pass through, and the inner side holding part 122A and the outer side holding part 122B are sandwiched by the large-diameter part 131 and the middle-diameter part 133.

In this way, the holding force for holding the cables C is increased.

Moreover, with attachment of the pin 130, the holding force for maintaining the engagement of the inner side base part 121A of the flexional inner side holding member 120A and the flexional inner side engaging part 113A of the first link member 110 is also increased.

Likewise, the holding force for maintaining the engagement of the outer side base part 121B of the flexional outer side holding member 120B and the flexional outer side engaging part 113B of the first link member 110 is increased as well.

Further to the above, for instance, one of the inner side holding part 122A and the outer side holding part 122B may be formed with a plurality of locking holes (122Aa or 122Ba) that are arranged at a predetermined interval along the multi-joint link width direction S and penetrate in the multi-joint link flexional inner-outer direction U, and the other one of the inner side holding part 122A and the outer side holding part 122B may be formed with a plurality of protrusions that are arranged at a predetermined interval along the multi-joint link width direction S to be engaged freely with the locking holes (122Aa or 122Ba).

In this way, since it is not required to dispose the additional pin 130, the number of the parts can be reduced.

In this exemplary embodiment, the pin 130 is utilized to increase the holding force for holding the cables C. However, it is not necessary to use the pin 130 to fasten the cables C.

According to the technical concept, a gap between the inner side holding part 122A and the outer side holding part 122B may be formed smaller than the diameter of the cable C, and the inner side holding part 122A and the outer side holding part 122B may be formed harder, so that the inner side holding part 122A and the outer side holding part 122B can provide sufficient holding force to hold the cables C without the pin 130.

According to the structure illustrated in this exemplary embodiment, the flexional inner side engaging part 113A is formed with the inner side engaging pin 121Aa while the inner side base part 121A is formed with the inner side engaging hole 113Aa. Needless to say, the engaging pin and the engaging hole may also be disposed reversely.

Likewise, the outer side engaging pin 121Ba of the flexional outer side engaging part 113B and the outer side engaging hole 113Ba of the outer side base part 121B may also be disposed reversely.

In addition, multi joint links 100A may be disposed in two or three or more rows along the multi-joint link width direction S if required.

Accordingly, in the case that the number of the cables C increases, the cables C can still be steadily supported.

Multiple multi-joint links 100A may also be stacked in the multi-joint link flexional inner-outer direction U.

Accordingly, in the case that there is limited space in the multi-joint link width direction S, multiple cables C can still be supported.

In the cable protection and guide device 100 of the exemplary embodiment of the present invention that is obtained according to the above, the multi joint link 100A includes the first link member 110 and the second link member 140, which serve as the plurality of link members, and the pair of holding members 120, which includes the flexional inner side holding member 120A and the flexional outer side holding member 120B and is attached to the first link member 110, as at least one part of the plurality of link members, for holding the cable C between the flexional inner side and the flexional outer side. The first link member 110 includes the connection pin 111 formed at one end side thereof in the cable longitudinal direction T, the pin hole 112 formed at the other end side thereof in the cable longitudinal direction T to be rotatably engaged with the connection pin 111, and the flexional inner side engaging part 113A and the flexional outer side engaging part 113B disposed between the connection pin 111 and the pin hole 112 in the cable longitudinal direction T. The flexional inner side holding member 120A includes the inner side base part 121A to be engaged with the flexional inner side engaging part 113A and the inner side holding part 122A that extends from the inner side base part 121A toward two outer sides of the multi-joint link width direction S to be in contact with the cable C at the flexional inner side, wherein the inner side base part 121A and the inner side holding part 122A are formed integrally with each other. The flexional outer side holding member 120B includes the outer side base part 121B to be engaged with the flexional outer side engaging part 113B and the outer side holding part 122B that extends from the outer side base part 121B toward two outer sides of the multi-joint link width direction S to be in contact with the cable C at the flexional outer side and cooperates with the inner side holding part 122A of the flexional inner side holding member 120A to hold the cable C, wherein the outer side base part 121B and the outer side holding part 122B are formed integrally with each other. Thus, abrasion of the cable skin of the cable C can be prevented and, when compared with the conventional structure that the interior of the link member is made hollow where the cable C is inserted therethrough, the position of the multi-joint link 100A can be held with high precision, the output of the power source of the device can be reduced, the impact sound can be reduced, problems such as breaking of the cable C resulting from an excessive force on the cable C caused by different bending radii can be avoided, and the forces that twist the multi-joint link 100A in certain directions can be mostly nullified.

Furthermore, the flexional inner side engaging part 113A, which is one of the flexional inner side engaging part 113A and the inner side base part 121A, has the inner side engaging pin 121Aa while the inner side base part 121A, which is the other one of the flexional inner side engaging part 113A and the inner side base part 121A, has the inner side engaging hole 113Aa to be engaged with the inner side engaging pin 121Aa. The flexional outer side engaging part 113B, which is one of the flexional outer side engaging part 113B and the outer side base part 121B, has the outer side engaging pin 121Ba while the outer side base part 121B, which is the other one of the flexional outer side engaging part 113B and the outer side base part 121B, has the outer side engaging hole 113Ba to be engaged with the outer side engaging pin 121Ba. Accordingly, the flexional inner side holding member 120A and the flexional outer side holding member 120B can be attached to the first link member 110 easily.

Moreover, the inner side holding part 122A and the outer side holding part 122B respectively include a plurality of locking holes 122Aa and 122Ba that are arranged at a predetermined interval along the multi-joint link width direction S and penetrate in the multi-joint link flexional inner-outer direction U, and the locking holes 122Aa and 122Ba are formed to be freely engaged with the pin 130, which is a member other than the flexional inner side holding member 120A and the flexional outer side holding member 120B, so as to prevent abrasion of the cable skin of the cable C with certainty and prevent abrasion of the cable skin that results from contact between multiple cables C.

In addition, the hardness of the flexional outer side holding member 120B is set to be lower than the hardness of the flexional inner side holding member 120A, so that the noise that occurs during movement of the cables can be significantly reduced with great effectiveness.

What is claimed is:

1. A cable protection and guide device, comprising:

a multi-joint link formed by connecting a plurality of link members in a cable longitudinal direction, wherein the cable protection and guide device guides a cable from a cable fixed end to a cable movable end, the multi-joint link comprises a linear portion and a flexional portion, wherein the linear portion is in contact with a support surface of a support body and the flexional portion is separated from the support surface, the linear portion comprises an inner side and an outer side and the flexional portion comprises an inner side and an outer side, the inner side of the linear portion is connected to the inner side of the flexional portion, the outer side of the linear portion is connected to the outer side of the flexional portion, and at least part of the outer side is in contact with the support surface, wherein the multi-joint link comprises the plurality of link members and a pair of holding members, in which the pair of holding members is attached to at least one part of the plurality of link members and comprises a flexional inner side holding member and a flexional outer side holding member to hold the cable between a flexional inner side and a flexional outer side, wherein the at least one part of the plurality of link members comprises a connection pin arranged at one end side thereof in the cable longitudinal direction, a pin hole arranged at the other end side thereof in the cable longitudinal direction to be rotatably engaged with the connection pin of another link member, and a flexional inner side engaging part and a flexional outer side engaging part disposed between the connection pin and the pin hole in the cable longitudinal direction, wherein the flexional inner side holding member comprises an inner side base part to be engaged with the flexional inner side engaging part and an inner side holding part, which extends from the inner side base part toward a width direction of the multi-joint link and is in contact with the cable at the flexional inner side, wherein the inner side base part and the inner side holding part are formed integrally with each other, the width direction of the multi-joint link is perpendicular to the cable longitudinal direction, and wherein the flexional outer side holding member comprises an outer side base part to be engaged with the flexional outer side engaging part and an outer side holding part, which extends from the outer side base part toward the width direction of the multi-joint link and is in contact with the cable at the flexional outer side and cooperates with the inner side holding part of the flexional inner side holding member to hold the cable, wherein the outer side base part and the outer side holding part are formed integrally with each other.

2. The cable protection and guide device according to claim 1, wherein one of the flexional inner side engaging part and the inner side base part comprises an inner side engaging pin while the other one of the flexional inner side engaging part and the inner side base part comprises an inner side engaging hole to be engaged with the inner side engaging pin; and one of the flexional outer side engaging part and the outer side base part comprises an outer side engaging pin while the other one of the flexional outer side engaging part and the outer side base part comprises an outer side engaging hole to be engaged with the outer side engaging pin.

3. The cable protection and guide device according to claim 1, wherein the inner side holding part and the outer side holding part respectively comprise a plurality of locking holes that are arranged at a predetermined interval along the width direction of the multi-joint link and penetrate in a multi-joint link flexional inner-outer direction, and the locking holes are formed to be freely engaged with a pin, which is a member other than the flexional inner side holding member and the flexional outer side holding member.

4. The cable protection and guide device according to claim 1, wherein one of the inner side holding part and the outer side holding part comprises a plurality of locking holes that are arranged at a predetermined interval along the width direction of the multi-joint link and penetrate in the multi-joint link flexional inner-outer direction, while the other one of the inner side holding part and the outer side holding part comprises a plurality of protrusions that are arranged at a predetermined interval along the multi-joint link width direction to be engaged freely with the locking holes respectively.

5. The cable protection and guide device according to claim 1, wherein a hardness of the flexional outer side holding member is set to be lower than a hardness of the flexional inner side holding member.

* * * * *